Patented Sept. 19, 1950

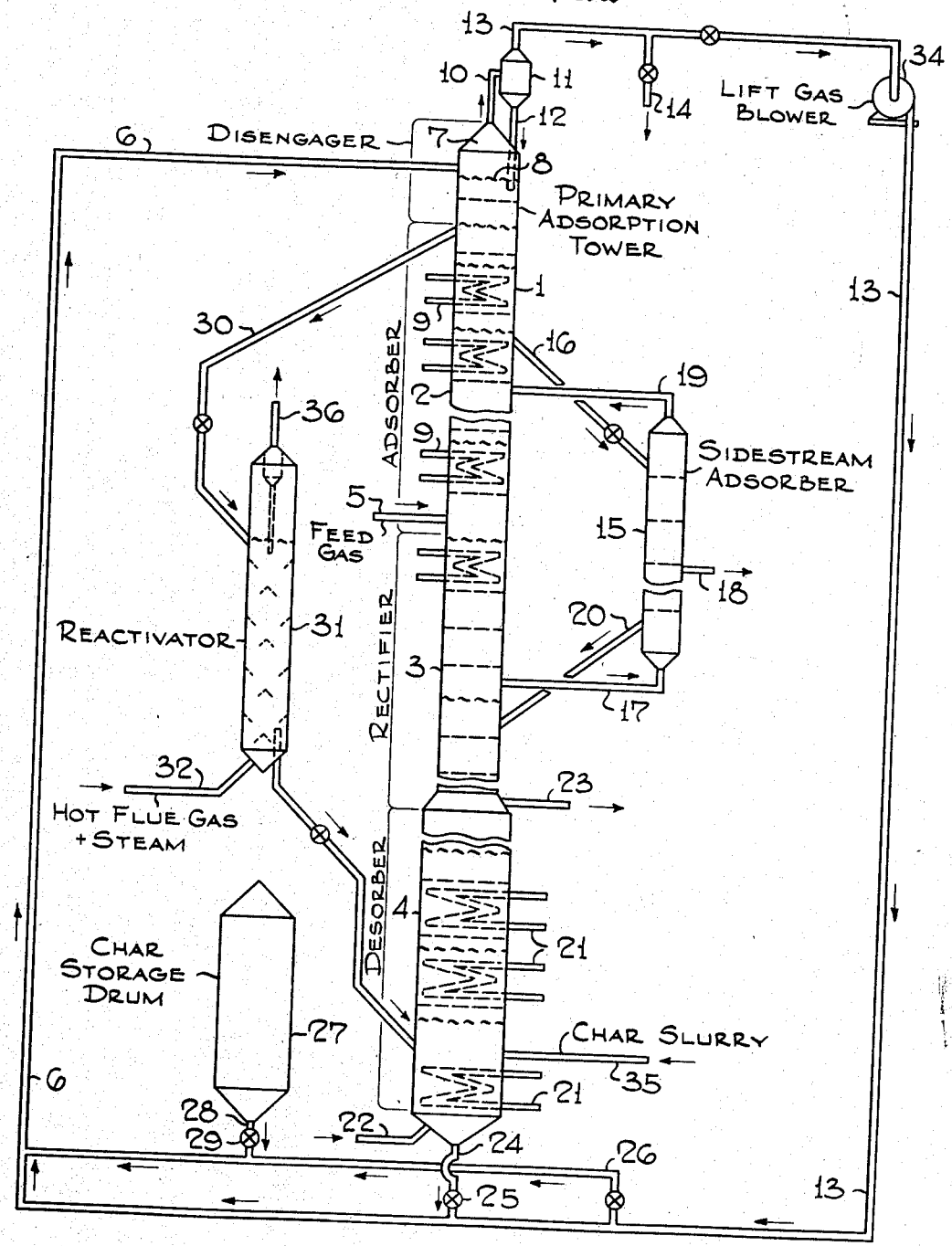

2,523,149

UNITED STATES PATENT OFFICE 2,523,149

FRACTIONATION OF GASES WITH SOLID ADSORBENTS

Harold W. Scheeline, East Orange, N. J., assignor to Standard Oil Development Company, a corporation of Delaware Application December 17, 1948, Serial No. 65,943

6 Claims. (Cl. 183—114.2)

This invention relates to improvements in the art of fractionating mixtures by countercurrent contact of mixed vapors with moving fluidized masses of solid adsorbent particles. It applies especially to the fractionation of gaseous or vaporous mixtures of hydrocarbons.

The fractionation of a gaseous mixture by causing it to flow upwardly through an adsorption zone where it contacts a fluidized adsorbent material such as silica gel or carbon in small particle or powdered form which is passed downwardly through this zone has been already described. The adsorbent leaving the bottom of the adsorption zone is heated, with or without contact with a stripping gas such as steam, to desorb the adsorbed component of the gas, which is separately recovered. The stripped adsorbent is then cooled and returned to the top of the adsorption zone for re-use.

In such operation the adsorbent can be caused to exercise highly selective action in removing more readily adsorbed materials, such as hydrocarbons of higher boiling point, substantially completely from mixtures containing less readily adsorbed materials, such as similar hydrocarbon homologs of lower boiling point, if suitably extensive countercurrent contact of the gas mixture and solid adsorbent is provided to supply the necessary stages for the removal of the higher boiling hydrocarbon to the extent desired. However, it is difficult to obtain selective desorption of any particular component from the adsorbent. Each adsorbed component exercises its own vapor pressure and the gas composition in contact with the solid adsorbent thus tends to approach an equilibrium concentration for each adsorbed compound. Thus, under adsorption conditions, the solid adsorbent tends to adsorb appreciable quantities of each component present in the gas mixture, and under desorption conditions the adsorbent tends to release appreciable quantities of each compound which has been adsorbed. The lower boiling compounds of any particular chemical series are generally released more readily than the higher boiling compounds but under ordinary conditions, if both types of compounds have been adsorbed, the separation of the more volatile components in a state of high purity becomes very difficult. An even more difficult problem attends the concentration of an intermediate fraction from a mixture containing both more volatile and less volatile homologs.

An object of the present invention is to provide an improved process and apparatus for accomplishing such separation of intermediate fractions in a state of high purity by means of a solid adsorbent from mixtures also containing compounds which are less readily adsorbed than the desired intermediate components and also containing compounds which are more readily adsorbed than the desired intermediate components. Another object of this invention is to provide an improved process and apparatus for accomplishing the separation of two or more such intermediate component fractions.

According to the terms of this invention the separation of an intermediate fraction in a state of high purity is accomplished by withdrawing a stream of fluidized solid from the adsorbing section of the adsorption tower at a point above the point of introduction of the feed, withdrawing a stream of vapor from the rectification section of the adsorption tower at a point below the point of introduction of the feed and passing the two streams to an auxiliary tower where they pass in countercurrent flow in such a manner that a rectified stream of a pure intermediate fraction is removed from a point near the center thereof. The auxiliary tower thus serves a three-fold purpose, viz., (1) stripping of light components, (2) production of pure intermediate components and (3) adsorption of the heavier components.

These and other objects of this invention will be apparent from the following description of one method of its application in a process for fractionation of a mixture of hydrocarbon gases by means of granular activated carbon.

In the fractionation process the hydrocarbon feed gas is passed under pressure of about 30 p. s. i. g. into an intermediate point of an adsorption tower. Activated charcoal of approximately 50–200 micron average particle size enters the top of the tower and flows downwardly as a fluidized dense bed countercurrent to the upflowing hydrocarbon gas. The tower contains perforated plates or other stage-producing devices with overflows for the charcoal in order to provide step-wise countercurrent contact between the solid and vapor. The charcoal passes through a zone above the feed-point where heavier components of the gas are selectively adsorbed, through an enriching zone below the feed-point in which light constituents are stripped off by reflux vapor, and then through a heating and steaming section in which it is desorbed by heating and stripping countercurrently with steam. The combined steaming and heating serve to strip the adsorbed gases, part of which are removed as product via cyclones from the disengaging section of the tower and part being refluxed up the column. The hot stripped charcoal from the bottom of the heater is conducted upwardly by the action of high velocity recycled overhead lift gas which is repressured by suitable blowers. The hot charcoal is cooled by passage through one or more suitable cooling stages and is then ready for another cycle of the adsorption process.

Suitable apparatus for use in this process is shown diagrammatically in the attached drawing. The figure is a view in sectional elevation of one type of apparatus adapted to carry out the process of the invention.

Referring to the drawing, numeral 1 represents a primary adsorption tower which is divided into an uppermost disengaging section 7, an adsorber section 2 located above the feed-point 5, a rectifier section 3, directly below the feed-point, and a desorber section 4 below the rectifier section. A feed gas which for purposes of example may be a mixture of hydrogen, methane, $C_2$ hydrocarbons, $C_3+$ hydrocarbons and inerts is introduced into the primary adsorber tower via line 5 at a point between the adsorber section and the rectifier section. A fluidized mass of adsorbent, the source of which will be described, is allowed to pass downwardly through the plates of the adsorption tower on which the adsorbent reaches a level indicated by the numeral 8. The fluidized adsorbent is introduced into the top of the adsorber at a temperature of about 400° F. to 500° F. In its passage down through the adsorber section of the tower, the adsorbent is cooled by a series of cooling units located on the successive trays of the tower so that by the time the fluidized adsorbent reaches the feed-point, it has been cooled down to a temperature in the neighborhood of 100° F. to 200° F., preferably about 150° F.–170° F. The fluidized adsorbent passes down the tower at such a rate that substantially all the $C_2$ and heavier hydrocarbons are selectively adsorbed on the adsorbent within the adsorber section while the methane, nitrogen and lighter components pass overhead through line 10 into cyclone 11 and out through line 13. Entrained adsorbent is returned to the tower via dip leg 12.

The adsorbent passes down the tower into the rectifier or enriching section 3 below the feed-point wherein equilibrium is brought about between the methane, nitrogen and the lighter gases which may have been adsorbed and the $C_2+$ hydrocarbons by refluxing the enriched adsorbent with $C_2+$ hydrocarbons which have been desorbed from the adsorbent at a point within the desorber section 4. In the upper part of section 3, therefore, any nitrogen, methane or lighter gases which may have remained on the adsorbgases as it passes down through the tower are desorbed by the action of the refluxed $C_2+$ hydrocarbons due to the more selective action of the adsorbent for the heavier hydrocarbons. The nitrogen, methane and lighter material flow upwardly through the rectifier into the adsorber section and are withdrawn from the system via line 10. A number of rectifier zones may be employed depending upon the number of streams of hydrocarbons of different molecular weights which are to be obtained from the desorption action.

In the lower section of the rectifier zone the adsorbent is refluxed with the heavier components of the hydrocarbon feed, for example, the $C_3+$ of the hydrocarbons whereby the desorption of the $C_2$ hydrocarbons is brought about. The $C_2$ hydrocarbons are removed in controlled amounts as a vapor stream from a point near the center of the rectifier zone via line 17 and introduced into an external sidestream adsorber 15 to an upper section of which is fed a controlled amount of a fluidized mass of adsorbent via line 16 from the adsorber section of the primary adsorption tower. The sidestream adsorber is similar in construction to the primary tower but is smaller in diameter and has fewer trays. The adsorbent stream is substantially free of $C_3+$ constituents and has adsorbed on it only the $C_1$, $C_2$ and lighter materials. The $C_2$ vapor sidestream entering the bottom of the sidestream adsorber is passed countercurrently to the solid stream. By properly controlling the flow of vapor and the flow of solid adsorbent to the tower a substantially pure $C_2$ cut can be withdrawn via line 18 as a vapor product from a plate near the center of the tower. In the upper part of the sidestream adsorber the solid is stripped free of methane and lighter components while in the lower part the solid adsorbs the $C_3$ and $C_4$ components from the upflowing vapor. The vapor stream leaving the top of the tower via line 19 contains some $C_2$ hydrocarbons but consists substantially of methane and lighter materials and is re-introduced into the adsorber section of the primary adsorption tower. The solid stream leaving the sidestream adsorber is introduced via line 20 into the rectifier section of the primary adsorption tower. Thus the sidestream adsorber is supplied with a stripping section for the removal of the $C_2$ in-methane and lighter materials from the $C_2$ intermediate cut. However, the rectifier of the primary adsorption tower performs the operation of rectifying the $C_3+$ stream from the sidestream tower. The intermediate heart cut withdrawn from the sidestream adsorber via line 18 is passed through appropriate cyclones for separation of entrained solids therefrom and thence to a scrubber for final clean-up. The latter equipment is conventional in the art and is not shown in the diagram.

Returning to the desorber section of the primary adsorption tower, the adsorbent, substantially free of $C_2$ and lighter gases, passes from the rectifier section 3 into the desorber section 4. In this section desorption of the $C_3$ hydrocarbons is accomplished by means of heat supplied to the enriched adsorbent by suitable heating means such as condensation of high boiling liquid, hot flue gas, etc., illustrated by units 21 located within the trays of the desorber section. The action of the heat together with steam disengages the $C_3+$ hydrocarbons from the adsorbent and they pass upwardly through the desorber section. Steam is added to the bottom of the desorber section via line 22. Additional steam is formed from the vaporization of water contained in the charcoal slurry entering the desorber section via line 35. The adsorbent slurry emanates from the tail gas scrubber, the $C_2$ product scrubber and the $C_3$ quench tower as will be explained later. Passing up through the desorber therefore are the $C_3+$ hydrocarbons and water vapor which are removed in part via line 23 and led through appropriate cyclones to a quench tower to knock out steam and to scrub out any adsorbent material of small particle size which may have passed through the cyclones.

The lean or stripped adsorbent is removed from the primary tower via line 24 and valve 25 and is returned via lines 6 and 13 by the action of high velocity lift gas repressured by blower 34. The charcoal passes through gas lift line 6 and is introduced into the gas-solid disengaging section 7 wherein the bulk of the solid separates from the lift gas. The lift gas passes out the tower via lines 10 and 13 after passing through cyclone 11. The cyclone serves to remove the bulk of the entrained solid of any appreciable size which solid is returned to the tower via dip leg 12. A portion of the lift gas is removed from line 13 via line 26 and is employed to lift make-up adsorbent from storage drum 27 via line 28 and valve 29 into the gas lift line 6.

The tail gas emerging from the primary adsorption tower via line 13 is removed in part via line 14 to a tail gas scrubber where the remaining entrained solids of fine particle size are removed therefrom by means of water scrubbing. The fine solids recovered from the tail gas scrubber, from the $C_2$ product scrubber, and the $C_3$ quench tower are all recovered in the form of a water slurry. The individual slurries are concentrated and introduced into the bottom of the desorber section via line 35.

During the passage of the adsorbent through the adsorption-desorption cycle, some of the adsorbent becomes deactivated due to the collection thereon of impurities, such as heavy hydrocarbons, polymers, etc., which were contained in the original feed stream or which were formed by reaction between the components of the stream during the cycle. In order to reactivate the deactivated adsorbent a portion of the adsorbent is removed continuously from the primary adsorber via line 30 and introduced into reactivator 31. In vessel 31 the spent adsorbent is treated with steam or with hot flue gas at temperatures in the neighborhood of 1000° to 1600° F. During this heating treatment contaminants are removed from the adsorbent and passed overhead from the reactivator via line 36. The hot reactivated adsorbent is returned via line 33 to the bottom of the desorber section of the primary tower for use again in the adsorption cycle.

In the primary adsorption tower and in the sidestream adsorber the adsorbent is handled as a dense fluid bed of approximately 50-200 micron average particle size. The particles possess considerable motion relative to each other and plates or packing are required in the tower in order to effect sufficient countercurrent contact between solid and vapor. In one modification of the tower design the tower is supplied with perforated plates with simple standpipe overflows for the solid, the vapor passing upward through the plate perforations. Approximately 2 to 3 feet of dense bed and 2 feet of vapor disengaging space per plate are adequate for establishment of equilibrium between vapor and solid. To feed the auxiliary tower fluidized solid flows from the tower 1 through a standpipe into line 16 provided with a slide valve. A similar system is used for the return of the fluidized solids from vessel 15 to rectifier section 3 via line 20.

The flow of adsorbent downwardly through the equipment has been described above. The fractionation of hydrocarbon feed mixtures in combination with such an operation will now be described. The example given is merely for purpose of illustration and the invention is not to be limited to the particular operating conditions stated as these vary with the nature of the feed and the nature of the adsorbent.

Referring again to the drawing a feed gas mixture containing hydrogen, methane, and $C_2$ hydrocarbons, ethane and ethylene, and $C_3$ and higher hydrocarbons is supplied via line 5 to the bottom section of the absorber 2 at which point the carbon may have a temperature of about 100° to 200° F. At this point a pressure preferably of about 1 to 7 atmospheres may exist. The feed gas passes up through the adsorber section and all of the $C_2+$ hydrocarbons are absorbed by the time it reaches the top of the absorber section. The unadsorbed gases pass out through line 10 through cyclone 11 into line 13. The temperature of the granular activated charcoal entering the top of the absorber is approximately 500° F. However, as the carbon gradually flows downwardly through the absorber section of the tower, it becomes progressively cooled by one or more coolers represented by the numeral 9. The unadsorbed gas passing upwardly through the adsorber section 2 carries out any steam being brought down with the hot carbon as it flows downwardly from the adsorber section and thus prevents condensation of water on the carbon as it is cooled and loss in capacity for hydrocarbons.

The gases reaching the upper portion of the adsorber are substantially free of $C_3$ and heavier hydrocarbons hence the carbon entering line 16 contains only adsorbed $C_2$ hydrocarbons and much smaller amounts of methane. In the sidestream adsorber 15 this carbon is refluxed with vapors entering the bottom thereof via line 17. The sidestream adsorber acts as a rectification zone where there is displaced any methane carried into the vessel with the carbon via line 16. This methane is displaced and passes upwardly through the top of the sidestream adsorber and out through line 19 for return to the adsorber section of the primary tower. Due to the refluxing action $C_2$ hydrocarbons are preferentially displaced from the carbon and sidestream of such $C_2$ hydrocarbons of high purity is withdrawn through line 18. The amount of withdrawal of the purified $C_2$ side stream is substantially equal to the amount of $C_2$ hydrocarbons present as the feed entering tower 1 via line 5. The remaining desorbed $C_2$ hydrocarbons not withdrawn via line 18 thus constitute an upwardly moving reflux countercurrent to the descending carbon in the upper part of vessel 15 thus providing adequate stripping of the methane and lighter components from the descending charcoal. Charcoal containing $C_3$ and higher hydrocarbons in addition to a small amount of $C_2$ hydrocarbons adsorbed thereon passes out of vessel 15 via line 20 into the rectifier section 3 of the primary tower 1.

The charcoal passing below the feed 5 into rectifier section 3 is treated by rising $C_2$ and higher hydrocarbon vapors which are desorbed by heating the charcoal by means of heater 21 in desorber 4 to a temperature of about 400° to 550° F. and/or stripping it with steam preferably at a similar temperature supplied vial line 22. A portion of the desorbed $C_2$ and heavier hydrocarbons is withdrawn via line 23 as the heavy product stream and the remainder passes upwardly through rectifier section 3 below the feed level to displace $C_2$ and lighter hydrocarbons from the descending carbon. Additional side streams representing one or more intermediate cuts may be obtained by expanding the rectifier section and removing heavier hydrocarbons such as $C_4$ and $C_5$ streams at lower points in the expanded rectifier section. These streams would contain mixtures of $C_3$ and $C_4$ hydrocarbons or $C_4$ and $C_3$ hydrocarbons, etc. Likewise intermediate cuts may be withdrawn from rectifier 3 above line 23. These side streams necessarily contain a mixture of $C_2$ and $C_3$ hydrocarbons with larger or smaller amounts of methane depending upon the point of withdrawal. Any hydrogen present in the feed gas will be removed along with methane in lines 10 and 19 in the above described operation. The process as described above is also applicable to the treatment of other hydrocarbon mixtures and other gas or vapor mixtures in general containing 3 or more components of different degress of adsorption.

It is preferred to remove carbon dioxide from the hydrocarbon feed by scrubbing before the feed enters the adsorption zone. If it is not removed it will appear in the products from the adsorption zone. In most instances hydrogen sulfide to some extent is also present in the hydrocarbon feed gas and its removal is also desired since it would appear in the $C_2$ and $C_3$ product streams. Both contaminants are simultaneously removed by scrubbing, for example, in a Girbotol unit.

Operating conditions—equipment size, etc.

An example of suitable operating conditions for conducting the process as described above with particular reference to the drawing is as follows:

The tower 1 is 12 feet in diameter, preferably expanded to 15 feet in the desorber section, and 120 feet high. The side-stream tower 15 is 20 feet high and 6 feet in diameter. Charcoal is supplied to primary tower 1 at the rate of 500 tons per hour, 14 tons being diverted through line 30 for reactivation in reactivator 31. About 350 standard cubic feet per second of a feed gas are supplied through line 5 at a temperature of 120° to 160° F., and at a pressure of 6 atmospheres, the column being operated to take only the necessary pressure drop without disturbance of the steady charcoal flow in both the primary tower and the side-stream tower. Thus tower 1 is operated at a top pressure of about 73 p. s. i. g. and a bottom pressure of about 80 p. s. i. g. and the sidestream tower 15 is maintained at 75 p. s. i. g. pressure. The coolers operate so that the temperature of the carbon immediately above the gas feed point is approximately 100° to 200° F., and the charcoal is heated by heater 21 to a temperature in the range of 400° to 550° F. Thus a temperature of approximately 180° F. is provided in the rectifier 3 at a point about where the sidestream vapor is removed via line 17. Substantially all of the stripping steam therefore is removed via line 23 with the heavier hydrocarbon product.

The solids heater which serves to desorb the product plus reflux vapor is designed with perforated plates, bubble-cap plates, or packing, etc., such that staging is achieved during the transfer of heat and less surface is required due to the improved average temperature difference. The perforated plates are fitted over vertical tubes which contain the heating medium (hot gases, condensing steam or Dowtherm, etc.) and the solids overflow from stage to stage on the shell side of the exchanger via standpipes. Steam or other stripping vapor passes upward through the unit, and serves to maintain the solid particles in a turbulently fluidized condition. Heat transfer coefficients exhibited by dense beds of fluidized solids are much higher than those realized with nonfluidized solid beds and therefore surface is saved. The solids cooler (dense fluidized solid on the shell side and the cooling water on the tube side) is also designed with packing or perforated plates fitting over the cooling tubes in order to stage the solid and minimize the heat exchange surface requirement.

The adsorption towers are designed with perforated plates equipped with standpipe overflows for the solids in order to obtain stepwise contact between solid and gas. Packing or bubble-cap plates can also be used. The charcoal inventory in a tower of a given diameter and height is very much smaller when the solid is fluidized than when it is handled as a moving bed. The adsorption tower may be reduced in cross-section below the point of gas feed entry, due to the smaller gas rate in this section, and thereby more uniform gas velocity is obtained throughout the tower. The reduced tower cross-section also corresponds to reduced adsorbent inventory and therefore an appreciable saving in initial plant investment is realized.

The quench tower, which serves primarily to remove steam and sensible heat from the product vapor, is also made to perform the added duty of recovering final traces of entrained solids (which are subsequently recycled to the process as a thickened slurry in water) and therefore the need for electrical precipitators or dust filters is eliminated.

In using fluidized solids of very small particle size, the time of contact required between solid and vapor in the adsorber and exchanger stages is reduced and therefore the solids inventory and initial investment are reduced. Also pressure drops in the towers, exchangers, and gas lifts are reduced and thus a saving in the work of gas compression is realized.

It is recognized that all of the gas streams described above which are withdrawn from contact with the carbon will contain appreciable quantities of dust or fines and that suitable dust separators are included in such gas lines before the gas is passed through the exit flow control valves. Suitable condensers and separators may also be provided where the gas contains readily condensible materials such as $C_4$ or heavier hydrocarbons, water vapor and the like. These have been omitted from the drawing for the purpose of simplicity.

Applications of the adsorption process

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixture of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

The process is particularly applicable to the recovery of ethane and $C_3$ hydrocarbons from refinery fuel gas; to the recovery of light ends from low pressure catalytic cracking gases; to the recovery of hydrocarbons and oxygenated compounds from hydrocarbon synthesis gas produced at low pressures; to the separation of deuterium from hydrogen, methane from nitrogen, and to the recovery of acetylene from the gases of the Wulff process.

What is claimed is:

1. An improved process for concentrating an intermediate component B from a vaporous mixture also containing a less readily adsorbed component A and a more readily adsorbed component C by means of a fluidized solid adsorbent, which comprises passing said adsorbent downwardly through a primary tower having an adsorption section above the tower feed-point and a middle rectification section and a lower desorption section below the feed-point, feeding said fluid mixture to the primary tower, removing unadsorbed component A from the top of said primary adsorption tower, removing desorbed component C from the desorption section of the primary tower, passing a vaporous stream containing components B and C but substantially free of component A from the rectification section to the lower portion of an auxiliary tower, passing a stream of adsorbent containing components A and B but substantially free of component C from the adsorption section of the primary tower to an upper section of the auxiliary tower, passing the vaporous stream containing components B and C upwardly through the downflowing stream of adsorbent containing adsorbed thereon component A and B in the auxiliary tower and removing a vaporous stream of component B, substantially free of components A and C from a center portion of the auxiliary tower.

2. An improved process for concentrating a $C_2$ hydrocarbon fraction from a gas mixture containing $C_1$ to $C_3$ hydrocarbons by means of a fluidized solid adsorbent, which comprises passing said adsorbent downwardly through a primary tower having an upper adsorption section above the tower feed-point, and a middle rectification section and a lower desorption section below the tower feed-point, feeding said gas mixture to the primary tower, removing methane from the top of the adsorption section of the primary tower, removing $C_3$ hydrocarbons from the desorption section of the primary tower, passing a stream of hydrocarbon gas containing $C_2$ and $C_3$ hydrocarbons but substantially free of methane from the rectification section of the primary tower to the lower portion of an auxiliary tower, passing a stream of adsorbent containing methane and $C_2$ hydrocarbons but substantially free of $C_3$ hydrocarbons from the adsorption section of the primary tower to an upper portion of the auxiliary tower, passing the $C_2$ and $C_3$ hydrocarbon gas stream upwardly through the descending adsorbent containing adsorbed thereon component A and B in the auxiliary tower, and removing a stream of $C_2$ hydrocarbons substantially free of methane and $C_3$ hydrocarbons from a center portion of the auxiliary tower.

3. A process according to claim 2 in which the unadsorbed hydrocarbons are returned from an upper portion of the auxiliary tower to the adsorption section of the primary tower, and in which the adsorbent comprising $C_3$ hydrocarbons is returned from the lower section of the auxiliary tower to the rectification section of the primary tower.

4. A process according the claim 2 in which the hydrocarbon gas mixture also contains nitrogen and lighter gases which are removed with the unadsorbed methane from the top of the primary adsorption zone.

5. A process according to claim 2 in which the hydrocarbon gas mixture also contains $C_4$ hydrocarbons which are removed with the $C_3$ hydrocarbons from the rectifier section of the primary tower.

6. A process according to claim 2 in which the granular solid adsorbent is charcoal and in which the hydrocarbon feed gas mixture contains methane, ethane, ethylene, propane and propylene.

HAROLD W. SCHEELINE.

REFERENCES CITED

The following references are of record in the file of this patent:

UNITED STATES PATENTS

| Number | Name | Date |
|---|---|---|
| 1,422,007 | Soddy | July 4, 1922 |
| 2,335,009 | Hollaway | Nov. 23, 1943 |
| 2,495,842 | Gilliland | Jan. 31, 1950 |

OTHER REFERENCES

A. I. Ch. E. Transactions, vol. 42, #4, August 25, 1946, pages 665–680, "Hypersorption Process," Clyde H. O. Berg.